United States Patent
Mitchell et al.

(10) Patent No.: US 8,526,751 B2
(45) Date of Patent: Sep. 3, 2013

(54) MANAGING IMAGE STORAGE SIZE

(75) Inventors: Joan LaVerne Mitchell, Longmont, CO (US); Ravi Prakash, Concord, NC (US)

(73) Assignee: International Business Machines Corporation, Armonk, NY (US)

(*) Notice: Subject to any disclaimer, the term of this patent is extended or adjusted under 35 U.S.C. 154(b) by 2931 days.

(21) Appl. No.: 09/939,066

(22) Filed: Aug. 24, 2001

(65) Prior Publication Data

US 2003/0044076 A1 Mar. 6, 2003

(51) Int. Cl.
*G06K 9/36* (2006.01)
*G06Q 40/00* (2012.01)

(52) U.S. Cl.
USPC .............................. 382/239; 705/45

(58) Field of Classification Search
USPC ............ 382/239–240, 251, 232; 375/240.19, 375/240.02, 240.26, 240.03; 348/231.2; 707/10, 104.1; 711/1; 705/45, 39, 35
See application file for complete search history.

(56) References Cited

U.S. PATENT DOCUMENTS

| | | | |
|---|---|---|---|
| 5,058,185 A | 10/1991 | Morris et al. | |
| 5,153,936 A * | 10/1992 | Morris et al. | 345/428 |
| 5,161,214 A | 11/1992 | Addink et al. | |
| 5,361,203 A | 11/1994 | Hiyama et al. | |
| 5,615,287 A | 3/1997 | Fu et al. | |
| 5,724,475 A | 3/1998 | Kirsten | |
| 5,754,697 A | 5/1998 | Fu et al. | |
| 5,870,725 A | 2/1999 | Bellinger et al. | |
| 5,970,176 A * | 10/1999 | Takayama | 382/239 |
| 6,032,148 A | 2/2000 | Wilkes | |
| 6,121,903 A | 9/2000 | Kalkstein | |
| 6,154,295 A | 11/2000 | Fredlund et al. | |
| 6,181,837 B1 | 1/2001 | Cahill et al. | |
| 6,526,099 B1 * | 2/2003 | Christopoulos et al. | 375/240.26 |
| 6,606,418 B2 | 8/2003 | Mitchell et al. | |
| 6,757,439 B2 | 6/2004 | Leeder et al. | |
| 7,043,086 B2 | 5/2006 | Rijavec et al. | |
| 7,120,303 B2 | 10/2006 | Mitchell et al. | |
| 7,260,265 B2 | 8/2007 | Prakash et al. | |
| 7,362,908 B2 | 4/2008 | Mitchell et al. | |
| 7,813,575 B2 | 10/2010 | Prakash et al. | |
| 2002/0003905 A1 * | 1/2002 | Sato et al. | 382/240 |
| 2002/0102028 A1 * | 8/2002 | Keller et al. | 382/239 |

FOREIGN PATENT DOCUMENTS

| | | |
|---|---|---|
| JP | 08-077332 | 3/1996 |
| JP | 08077332 A | 3/1996 |
| JP | 09001958 A | 7/1997 |
| JP | 09181892 A * | 7/1997 |
| JP | 409181892 A | 7/1997 |

(Continued)

OTHER PUBLICATIONS

English Translation of JP 09181892 A.*

(Continued)

*Primary Examiner* — Wenpeng Chen
(74) *Attorney, Agent, or Firm* — Douglas A. Lashmit; Hoffman Warnick LLC

(57) ABSTRACT

A system and method for managing image storage size. The invention uses reduction criteria to determine how much to reduce the storage size of an image over time. In one embodiment, reduction of data storage size includes degrading the quality of the image. The reduced-size image replaces the image from the previous iteration. The smaller storage allows longer access to the information in quick access storage and quicker transmission time.

35 Claims, 11 Drawing Sheets

(56) References Cited

FOREIGN PATENT DOCUMENTS

| | | |
|---|---|---|
| JP | 11-24974 | 1/1999 |
| JP | 11110650 A | 4/1999 |
| JP | 11282728 A | 10/1999 |
| JP | 2000029756 A | 1/2000 |
| JP | 02000152171 A | 5/2000 |
| JP | 2000-222257 | 8/2000 |
| JP | 2000339542 A | 12/2000 |
| JP | 2001-84165 | 3/2001 |
| JP | 2001184453 A | 7/2001 |

OTHER PUBLICATIONS

Prakash, Ravi, Joan L. Mitchell, David A. Stepneski, "Enhanced JPEG Compression of Documents," Mar. 28, 2001.

"Internet Image Statements," IBM Technical Disclosure Bulletin, Oct. 1996, pp. 43-46.

Hiroshi Murakami, "Information Materials for IDS," Reference letter cited by JPO Examiner as Prior Art, Jan. 23, 2009, 1 page.

Hiroshi Murakami, "Information Materials for IDS," Corrected Reference letter cited by JPO Examiner as Prior Art, Jan. 23, 2009, 1 page.

* cited by examiner

MANAGING IMAGE STORAGE SIZE

BACKGROUND OF THE INVENTION

1. Technical Field

The present invention relates generally to image data, and more particularly, to a system and method for managing image storage size.

2. Related Art

With the Internet becoming an integral part of life, the ability to provide adequate data storage for image inventories is increasingly important. One exemplary industry where image inventory storage size is increasingly important is the United States banking industry. In this industry, digitized, compressed documents are initially stored in write-once media and archived for the legally required seven years. Documents to be imaged are generally created with strong (high contrast) information such as letters and correspondence with printed text and possibly a company logo. Some documents have background scenes, e.g., checks, but the vital information is usually printed in black or handwritten in blue or black ink. One common compression standard used is that promulgated by the Joint Photographic Experts Group (JPEG). Despite advanced compression techniques, a typical digital check record, which includes a header followed by compressed image segments of the front and back of the check, results in an average total record size of 40-50 kilobytes. Since there are approximately 80 billion checks written per year in the United States, the image inventory for seven years translates into 23,000-28,000 trillion bytes of compressed data for a single copy. Even a smaller bank's portion of this data is large.

In addition to the archived version, many banks also provide online document images of, for example, the preceding three months, to allow quick access by commercial and individual customers. Hence, two copies of at least a portion of a bank's image inventory are often maintained, which creates shortages of data storage. One mechanism to reduce online image storage requirements and allow online document image selection is through the use of a visual index of thumbnails such as disclosed in U.S. Pat. No. 6,154,295 to Freuland et al. In this setting, the customer can order additional copies of data from the "index" print. However, both the high resolution image and the dimension-reduced thumbnail are later discarded.

Magnifying the data storage problem is that many industries increasingly want to provide access to imaged documents for larger periods of time. For example, in the banking industry, it is preferred to provide imaged documents online for at least the past fifteen and a half months (i.e., from January of one year to the subsequent year's April) for tax purposes. Unfortunately, the increased data storage requirements make this service difficult to provide.

One mechanism some banks use to provide three months worth of imaged documents online is providing a small amount of images online (e.g., one month's worth) and using batch processes to an archive version for older images. However, batch processing creates other problems. One problem is that a batch process can take long periods of time to complete. Since customers would like to be able to browse and do research quickly, batch processing for older imaged documents is unacceptable. For example, an item cleared six months ago can take up to a week or longer to retrieve. Moreover, a first inquiry some times does not lead to the correct item being retrieved. In addition, the banks oftentimes charge the customers a large service fee for its efforts to retrieve the image from the archive version. In summary, batch processing-based image retrieval is inefficient and slow, and is not an adequate remedy for reducing image inventory size.

Another potential remedy to storage requirements is to provide further data compression. However, since continuous-tone compression techniques (e.g., JPEG) are generally lossy processes, care must be taken less increased compression removes vital information. By "lossy" is meant that the decompressed image is not quite the same as the initial image. In some applications, such as in the banking industry, document information must be maintained. Lossless methods for reducing storage size of an image are available but require increasing the complexity of the lossless compression technique used such as transcoding from generic Huffman tables to custom Huffman tables (i.e., Huffman tables tuned for each image), and transcoding from Huffman entropy coding to arithmetic entropy coding.

Another banking industry objective that is hindered by image inventory storage requirements is the ability to use imaged documents in day-to-day clearing operations. Currently one type of clearing operation is completed by providing document images on a compact disk (CD) to commercial customers. This means that hundreds of CDs are mailed to commercial customers every day, which increases the bank's operational expenses. Consequently, commercial customers expenses are high for this essential service, since the commercial banks often confirm the checks are not fraudulent before authorizing payment.

Another problem related to image inventory data storage size is that of quick transmission of images. The larger the size of image(s), the longer it takes to transmit.

The above-described problems in the banking industry are also found in other industries where image inventories are used. Other exemplary industries include: photography developers, photographic news agencies, catalog shopping, other Internet-based activities, old books scanned by libraries, scanned ledgers, genealogy material, business records, and all incoming mail for paperless office environments.

In many of these industries, pages are scanned in and the primary interest is in the content rather than the presentation. In these cases, optical character recognition (OCR) may have been applied to the scanned images in order to capture as much of the critical information as possible and convert it into coded text such as ASCII characters so text search and data mining techniques can be applied. Unfortunately, the OCR error rate is still significant. Having easy access to the poorer quality, but still legible image of the original document would assist quickly settling accuracy questions.

In view of the foregoing, there is a need in the art for a system and method for managing an image data storage size, such as those provided online, to reduce storage requirements, increase transmission speed, and meet customer requirements.

SUMMARY OF THE INVENTION

The invention is a system and method for reducing data storage size of image inventory based on reduction criteria. Reduction occurs as a recursive degrading of image quality. One benefit of the invention is that it allows the time an image inventory can be provided online to be extended, and the communication costs and bandwidth to be reduced. Another benefit of the invention is that, for images online, it reduces operational cost and thus the fees. Further, it provides for a periodic maintenance process which recursively reduces image inventory size, and thus optionally allows more space for new additions to the inventory. Access to a high quality image (i.e., legal archived version) can be maintained. Even a low quality image created using the invention is sufficient to confirm that it is the desired image so that errors in batch-fetching the highest quality version are avoided. Transmission speed of an image is also increased using the invention.

A first aspect of the invention is directed to a method for managing an image of an object stored in a database, the method comprising the steps of: reducing a storage size of the image from a base level to at least one secondary level based on reduction criteria, wherein each secondary level is smaller in storage size than the base level.

A second aspect of the invention is directed to a method of managing storage size of an image of an object, wherein the image is accessed by a user, the method comprising the steps of: reducing the storage size of the image based on reduction criteria to create a size-reduced version; allowing user access to the size-reduced version for a predetermined duration; and repeating the steps of reducing and allowing after expiration of the predetermined duration.

A third aspect of the invention includes a system for managing storage size of an image of an object where the image is accessed by a user online, the system comprising: a size-reduction evaluator to periodically evaluate whether the image is subject to a size reduction based on size-reduction criteria; and a size reducer to reduce the size of the image based on instructions from the size-reduction evaluator.

A fourth aspect of the invention provides a system for managing storage size of an image of an object, wherein the image is accessed by a user, the system comprising: means for evaluating the image based on reduction criteria to determine whether to reduce the data storage size of the image, leave the image alone or purge the image; and means for reducing the data storage size of the image based on the results of the means for evaluating.

A fifth aspect of the invention is directed to a computer program product comprising a computer useable medium having computer readable program code embodied therein for managing a size of a stored image that is accessible to a user, the computer program product comprising: program code configured to evaluate the image based on reduction criteria to determine whether to reduce the data storage size of the image, leave the image alone or purge the image; and program code configured to reduce the data storage size of the image based on the results of the evaluating.

The foregoing and other features and advantages of the invention will be apparent from the following more particular description of preferred embodiments of the invention.

BRIEF DESCRIPTION OF THE DRAWINGS

The preferred embodiments of this invention will be described in detail, with reference to the following figures, wherein like designations denote like elements, and wherein.

DETAILED DESCRIPTION OF THE INVENTION

Figure 1:
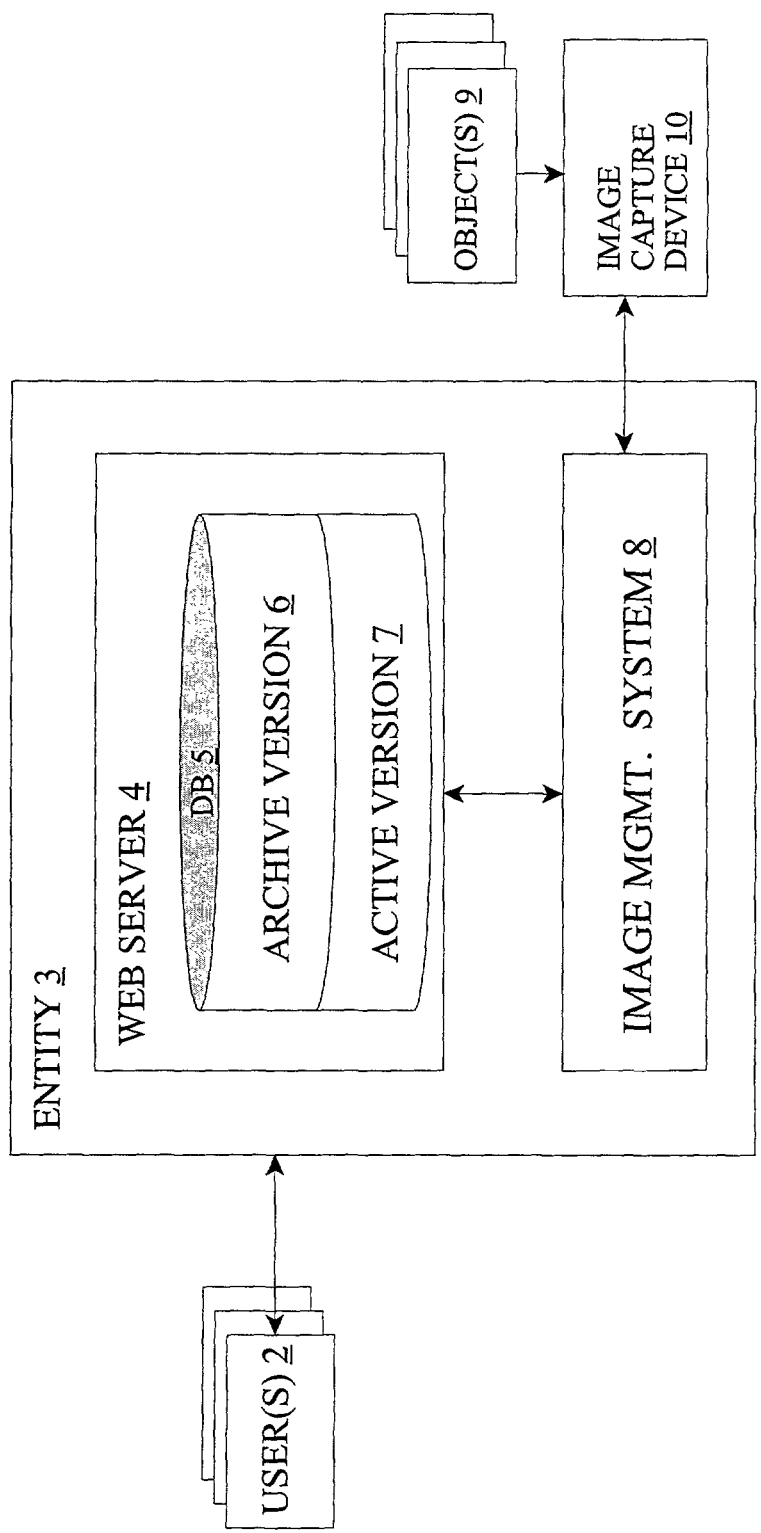
FIG. 1 shows a block diagram of an exemplary environment where the invention finds applicability.

For convenience purposes only, the following description includes the following subtitles:

I. Introduction
II. Image Capture System
III. Data Management System (DMS)
   A. Process and DMS Logic
   B. Reduction Criteria
   C. Exemplary Operation
IV. Alternatives and Other System Components I. Introduction FIG. 1 is a block diagram of one exemplary environment in which the present invention is applicable. In this setting, customer(s) or user(s) 2 access an entity 3 web server 4 in a known fashion to view stored images online that are part of an image inventory stored in a database 5. Entity 3 may be any institution that makes images available online. Images, as used herein, may be of any object and may include multiple parts. For purposes of this disclosure, the invention will be described with entity 3 as a financial institution such as a bank. Likewise, images will be described in terms of bank-related documents such as checks. The multiple parts of imaged checks may include a header, an image portion (e.g., check background art) and a text portion. User(s) 2 access is over known networks such as a local area network (LAN), wide area network (WAN) and/or the Internet. One preferred access mechanism is the Internet.

Web server 4 includes, or can access, database(s) 5. Database 5 may include an archive version 6 of a complete image inventory and an active, or online, version 7 of at least part of the complete image inventory. Archive version 6, which is optional, includes images that are stored for long periods of time, and generally are in a write once, read only form. For financial institutions, archived images may be of any document that must be stored for a legally mandated duration, e.g., seven years. Negotiable instruments such as checks are one of these type documents. It should be recognized that archived version 6, although shown for clarity to be part of database 5, may be stored in a variety of manners. One other common storage technique for archive version 6 is compact disc read only memory (CD ROM). Entity 3 also includes an image management system 8 capable of attaining images of object(s) 9 via an image capture device 10 and managing image inventory storage size. Image management system 8 interacts with database(s) 5 to control image data storage. System 8 may be part of web server 4, but in one preferred embodiment is a separate system.

Figure 2:
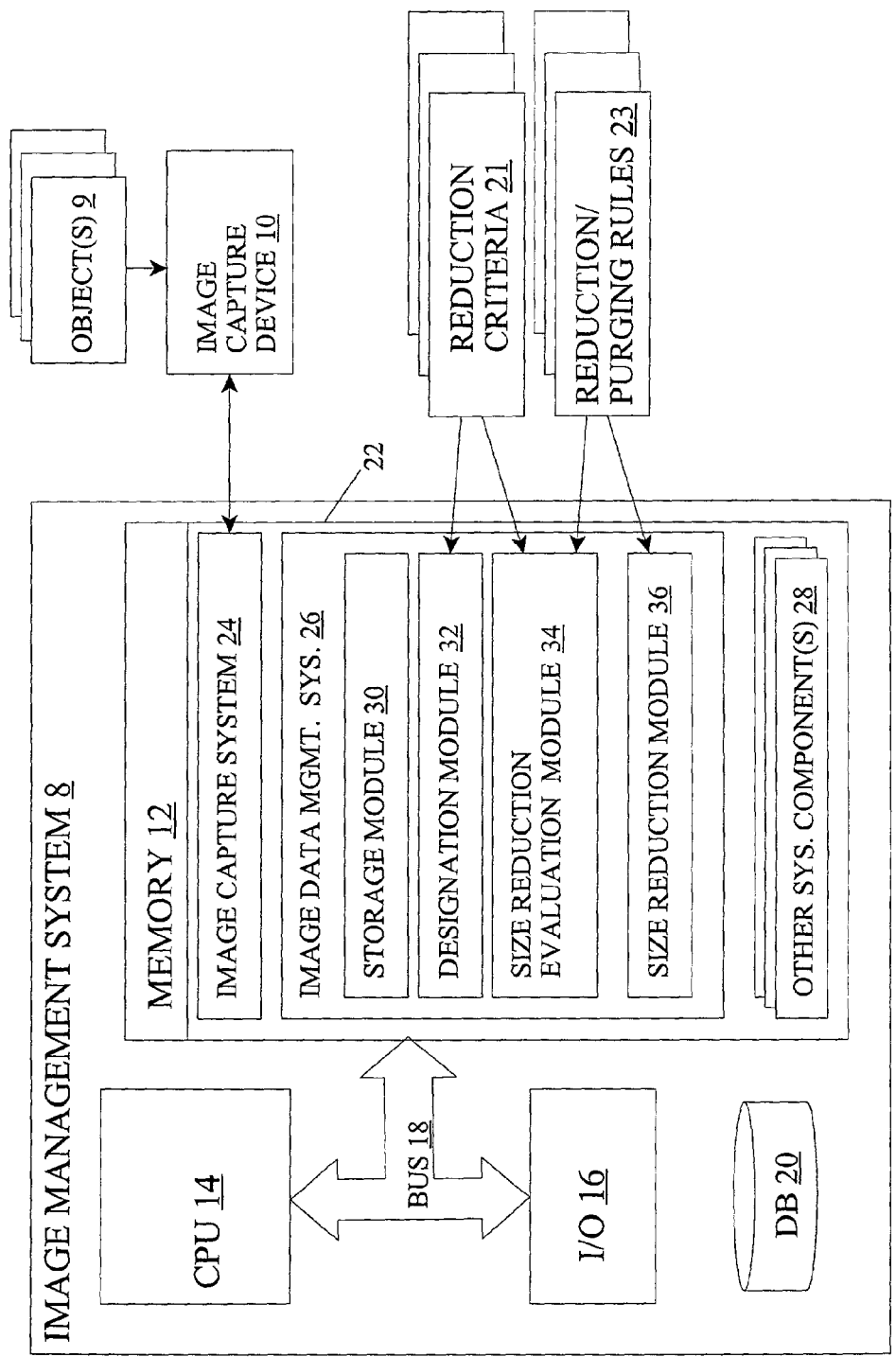
FIG. 2 shows a block diagram of an image management system of FIG. 1.

Turning to FIG. 2, image management system 8 preferably includes a memory 12, a central processing unit (CPU) 14, input/output devices (I/O) 16 and a bus 18. A database 20 may also be provided for temporary storage of image data and other data relative to processing tasks. Memory 12 preferably includes a program product 22 that, when executed by CPU 14, comprises various functional capabilities described in further detail below. Memory 12 (and database 20) may comprise any known type of data storage system and/or transmission media, including magnetic media, optical media, random access memory (RAM), read only memory (ROM), a data object, etc. Moreover, memory 12 (and database 20) may reside at a single physical location comprising one or more types of data storage, or be distributed across a plurality of physical systems. CPU 14 may likewise comprise a single processing unit, or a plurality of processing units distributed across one or more locations. A server computer typically comprises an advanced mid-range multiprocessor-based server, such as the RS6000 from IBM, utilizing standard operating system software, which is designed to drive the operation of the particular hardware and which is compatible with other system components and I/O controllers. I/O 16 may comprise any known type of input/output device including a network system, modem, keyboard, mouse, scanner, voice recognition system, CRT, printer, disc drives, image capture device 10, etc. Additional components, such as cache memory, communication systems, system software, etc., may also be incorporated into system 8.

As shown in FIG. 2, program product 22 may include an image capture system 24, a data management system 26, and other system component(s) 28.

II. Image Capture System

Image capture system 24 may be implemented in a variety of forms. For example, in terms of the banking industry, system 24 may be part of a high speed, high volume document processing system such as found in institutional banks. For example, system 24 may be implemented as part of an IBM 3897 Image Capture System. In another environment, image capture system 24 may be personal computer scanner software.

III. Data Management System

As shown FIG. 2, data management system (DMS) 26 includes a storage module 30, a designation module 32, a size reduction evaluation module 34 and a size reduction module 36. The functions of these components will become apparent via the following discussion of DMS 26 logic.

A. Process and DMS Logic

Figure 3:
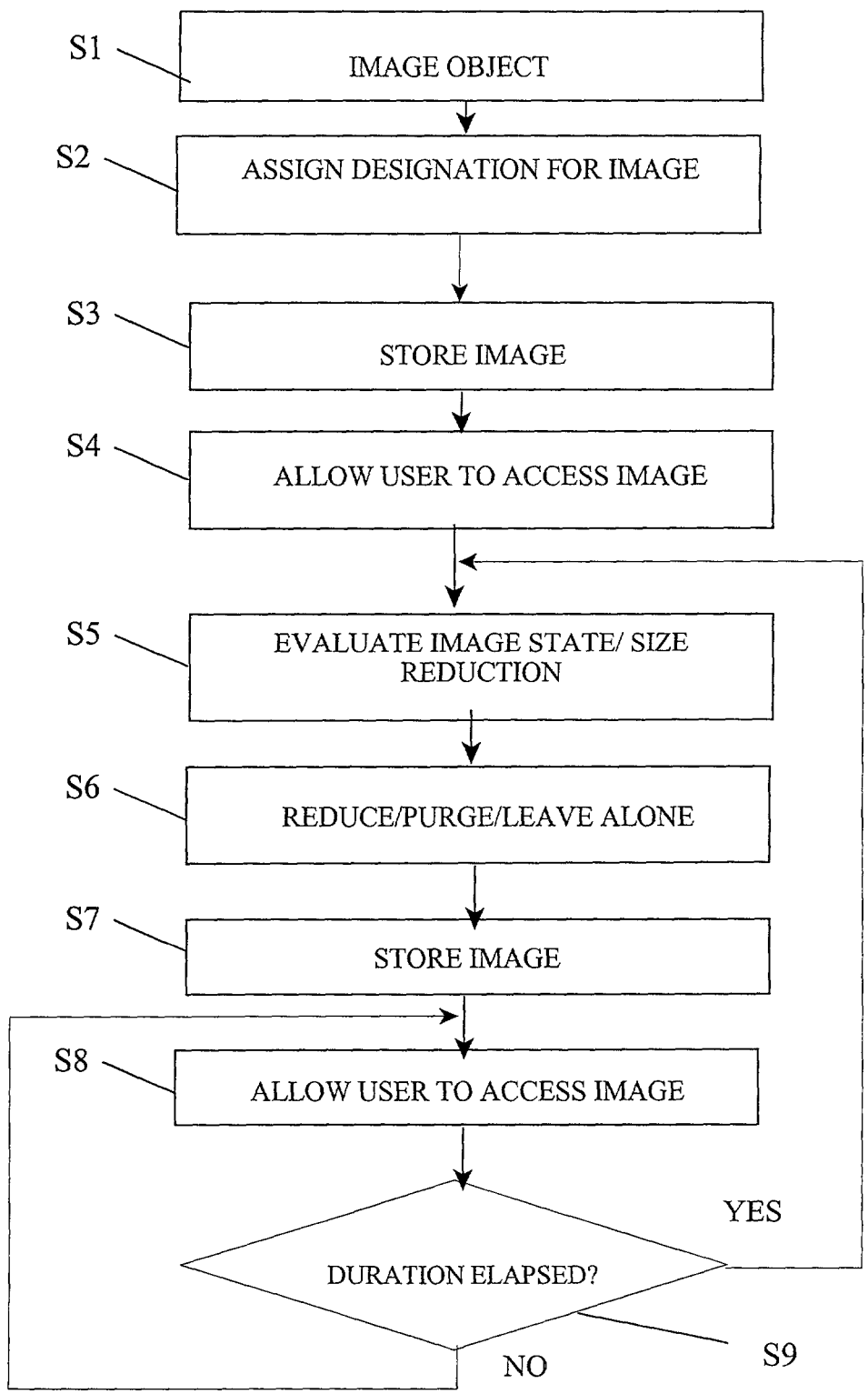
FIG. 3 shows a flow diagram of the logic of an image data management system of FIG. 2.

Turning to FIG. 3, the inventive process will be described in greater detail relative to the logic of DMS 26.

In a first precursor step S1, an object 9 (FIGS. 1 and 2) is imaged via image capture system 24 in a known fashion.

In step S2, a designation for each image is assigned by designation module 32. The designation indicates the status of the image based on non-real time reduction criteria. An image designation is preferably stored in a header portion of the image and is based on at least one reduction criteria 21 (FIG. 2). Reduction criteria, as will be discussed in greater detail below, are factors that determine to what extent the data storage size of an image can be reduced, e.g., over time. The factors that make up the reduction criteria can be selectively chosen and, hence, can differ from entity-to-entity, object-to-object, etc. A designation may be in the form of a simple list of reduction criteria values or may be a specially created alpha-numeric code indicative of reduction criteria values.

In step S3, the image is stored by storage module 30 during which the storage module may interact with image capture module 24. Storage module 30 creates a compressed, substantially lossless quality version, i.e., nearly photographic level, of the image. As indicated above, as an option, a copy of the image may be stored in archive version 6 (FIG. 1) and maintained for access by a user upon request. In the financial institution setting, archive version 6 is generally used for long term storage of documents that are legally mandated to be stored for long periods of time. One general duration is of seven years. As an alternative, when a user requests access to archive version, the user may include an indication of the duration that the archive version will be required.

Compression can be completed according to any now known or later developed standard. One preferred standard is that promulgated by the Joint Photographic Experts Group (JPEG). The image may be compressed anywhere from 10:1 to 20:1 ratio such that it includes minimal artifacts (e.g., noise in high contrast regions, blocking in gray regions) and legible text, if any. Although compressed, image data storage size remains relatively large.

In addition to storage in archive version 6, in our exemplary environment, storage module 30 stores a compressed, substantially lossless quality version of the image in active version 7 (FIG. 1) for access by user(s) 2. In a financial institution, the above step may include, for example, daily storage of "on us" checks and other documents.

In step S4, a user 2 is allowed to access the image in active version 7 in a known fashion. For example, user 2 may access web server 4 over the Internet and view images stored in active (online) version 7 via his/her browser or a graphical user interface (not shown) of entity 3. If an archive version 6 is maintained, user 2 may also request an image from archive version 6 of the image at any time. The archive version of the image may then replace a corresponding reduced-sized image in active version 7. When a user requests access to archive version 6, the user may include an indication of the duration that the high-quality active version of the image will be required. If active version 7 of the image is not for user access, e.g., online, the process would skip step S4 and proceed with step S5. Statistical data regarding user access and/or image utilization may be kept during this time for comparison with the reduction criteria.

In step S5, an image is evaluated by size reduction evaluation module 34. Evaluation can result in the following results: the image is left alone, the image is reduced in size or the image is purged. In addition, evaluation determines to what extent an image is reduced based on reduction criteria 21 and predetermined reduction/purging rules 23 (FIG. 1) that instruct size reduction module 36.

In an initial evaluation, reduction may include a special reduction processing. For instance, a portion of the image may be purged. For example, the image portion may be purged while the text fields are maintained. This purging of the image portion is advantageous where, for example, the image portion is provided for aesthetic purposes only. In terms of a check, text fields may include such information as amount, payor, payee, date, account number, and check number(s). The text information is helpful for doing research, and allows monitoring for long term patterns that can be used to detect suspicious or fraudulent use.

Actual evaluation may take a variety of forms. In one preferred embodiment, evaluation includes review of the image designation, which indicates the status of the image relative to non-real time reduction criteria, i.e., factors that do not change over time. Evaluation then determines what reduction or purging, if any, is required based on the image designation and the predetermined reduction/purging rules 23. For instance, in the banking industry, a designation noting that the image is for a user having substantial monetary amounts (one reduction criteria factor) held by the bank may have no reduction conducted, i.e., a reduction/purging rule mandates no reduction for an image exhibiting that reduction criteria factor. In contrast, an image for a user having a history of little or no use of active version 7 may be reduced to a very small sized image, i.e., one with lower quality. In addition, evaluation may include review of real-time reduction criteria, i.e., factors that change over time, such as available storage space, and prior reduction based on related reduction/purging rules 23.

In an alternative embodiment, designation step S2 may be skipped, and evaluation module 34 may evaluate the image according to reduction criteria 21 on a real time basis. That is, each time an evaluation is conducted, each image is analyzed relative to reduction criteria 21 to determine what, if any, reduction or purging is required.

Regardless of evaluation type, evaluation module 34 determines the state of each image relative to reduction criteria 21 and determines the applicable reduction/purging rule 23 to be implemented by size reduction module 36, at step S6. When reduction is necessary, size reduction module 36 undertakes the reduction operation. For purposes of this disclosure, the term "reduction" shall refer to the decreasing of the data storage size and not necessarily the actual dimensional size reduction of the image. "Reduction" includes any data compression technique so long as selections on image degradation, e.g., image legibility and quality, can be made even though the degradation may not be apparent to the human eye. Furthermore, "reduction" includes reducing and replacement of the starting image with the reduced image. In contrast, current techniques make a copy of the starting image and apply reduction techniques to the copy, which increases data storage requirements. This is especially inefficient where an archive version is maintained because three copies are present: the archive version, the active version (possibly an online version) and the reduced version. According to the invention, the copy of the active version is reduced and replaced, creating two copies if an archive version is maintained and one copy if an archive version is not maintained.

In one embodiment, reduction includes a process of entropy decoding the image, changing quantized coefficients and quantization tables (Q-tables), and entropy recoding the image, as described in related U.S. patent application Ser. No. 09/760,383, entitled "Enhanced Compression of Documents," which is hereby incorporated by reference. This changing of the quantized coefficients and quantization tables acts as a selective dynamic range reduction in a preprocessing step before JPEG encoding. Quantization tables are replaced after encoding with scaled-up quantization values, and any JPEG decoder can restore the dynamic range. Using this enhanced compression technique, an image is retrieved and restored with less bytes, and accordingly, lower quality.

In an alternative embodiment, reduction of the image can be accomplished with further compression, for example, using the JPEG baseline (DCT-based with Huffman coding), JPEG DCT-based with arithmetic coding, or the JPEG 2000 (wavelet-based with arithmetic coding) compression standards with larger quantization values. This process of increasing the lossliness of the compression, however, must be used cautiously where legibility of the information must be maintained.

Other alternatives for reducing the stored image size include: changing the number of horizontal samples, number of vertical lines, number of bits (precision) per sample, number of components, the size of the quantization, the type of compression (lossless to lossy), or changing the lossliness of the compression technique.

The above-described reduction techniques can be applied individually or in an arbitrary combination to achieve a desired reduction in storage size. For instance, each reduction/purging rule 23 may implement a particular combination of reduction techniques based on the reduction criteria.

If evaluation determines that purging is necessary, size reduction module 36 undertakes the purging operation. Once an image has been saved for any mandated time frame and/or has achieved a quality level where no further reduction is advisable (see, for example, the image of FIG. 11), a final step of evaluating/reducing would include purging.

Once reduction/purging is complete, at step S7, the image, if not purged, is again stored. In the case where the image inventory is available online, storage would be to active version 7.

Figure 7:
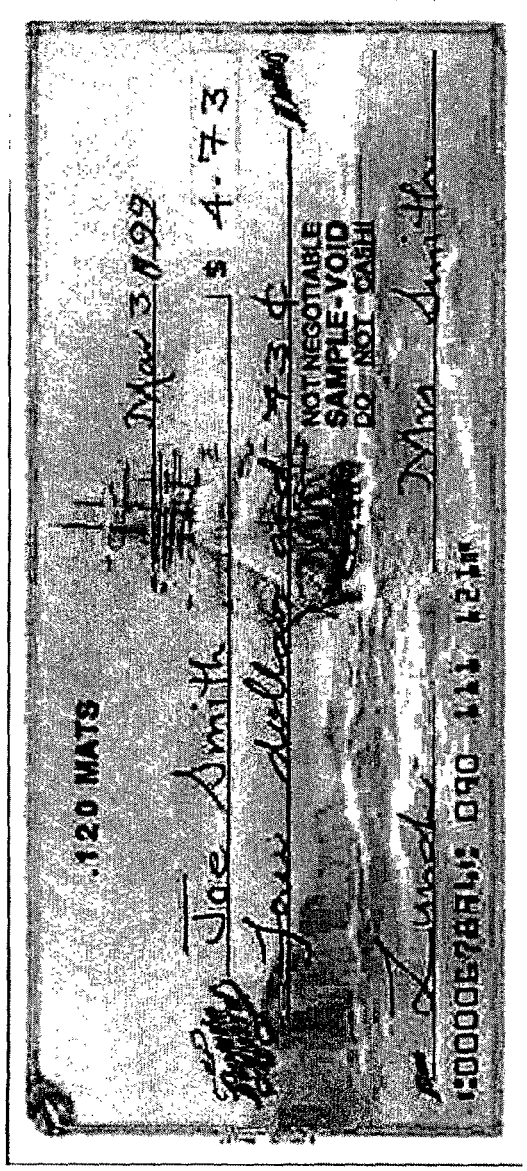

At step S8, if active version 7 of the image is for user access, a user would again be allowed to access images, e.g., online. Again, if an archive version 6 is maintained, a user 2 may also request an archive version, i.e., high quality version, of the image at any time. The archive version of the image may then replace a corresponding reduced-sized image in active version 7. When a user requests access to archive version 6, the user may include an indication of the duration that the high-quality active version of the image will be required. Statistical data regarding user access and/or image utilization may also be kept during this time for comparison with the reduction criteria. As shown in FIG. 7, the image is of lower quality but maintains its legibility. As will be described below, further reduction, e.g., decompression, additional dynamic range reduction, and recompression cycles, would further reduce data storage requirements.

In step S9, a determination of whether a predetermined duration has expired is made by image management system 26. The predetermined duration sets how much time passes between evaluations. Accordingly, an entity 3 can set evaluations to occur, for example, weekly, monthly, quarterly, etc. When the predetermined duration has expired, the process returns to step S5 for further evaluation, which can provide further reduction of image(s) based on the reduction criteria. When the predetermine duration has not expired, the process returns to step S8 and a user's access is continued.

B. Reduction Criteria:

As noted above, the reduction criteria are factor(s) that determine to what extent the data storage size of an image can be reduced. Factors that make up the reduction criteria can be selectively chosen and, hence, a wide variety of unique reduction criteria are possible. For example, reduction criteria may vary from entity-to-entity, image-to-image, user-to-user, etc. Further, some factors are based on real-time attributes and, hence, change over time. For example, such factors (described below) as: available data storage, suspicious activity, time since object creation and time since object imaging vary over time.

In terms of a financial institution, the reduction criteria may include, for example, the following factors:

1. Available data storage.
2. Time since creation and/or deposit (i.e., imaging) of object (document). For example, the creation date probably determines into which income tax year the document falls. The depositing date determines critical time periods after the depositing (e.g., the three days for crediting an account with the dollar amount).
3. Prior size reduction. This factor indicates the stage of legibility versus storage size of the image. At some stage further reduction will hurt legibility too much and purging the image may be a better choice.
4. Utilization or access history of the object (document), account and/or user. Statistical data such as the history of a user's online utilization may be an excellent indicator of future demand. For example, a user that has never requested an image from active version 7 indicates a non-computer user. For such accounts, the bank may want to immediately store only the lowest quality images. On the other hand, for an account with a history of problems and many requests for the backs of checks, the highest quality may be available longer. In addition, some types of documents may be accessed more often than other types of documents.
5. Object (document) value. Documents for large dollar amounts are a small percentage of all checks, but have exceptional value and are kept at the highest quality for longer.
6. Type of account. For example, a commercial account may be provided higher quality images than an individual account. Further, accounts with only a few checks may have them stored with better quality than accounts with many checks so that the storage per account is kept more uniform.
7. Volume of objects (e.g., checks) per user account.
8. User's total account value. A user's total account value may warrant providing extra services.
9. User selections of options and/or profile input. The user may know what options he/she is likely to need or use. In this instance, a financial institution can allow user(s) 2 to submit profiles and/or select their desired image reduction options. In one example, a user request for the high-quality archive version of an image may include an indication of the time for which the high-quality version should be available in active version 7. An authenticated version direct from entity 3 may be requested for a much-reduced fee under such circumstances.

10. User fees paid. Users could be charged fees for improved time/quality of the online image service. This factor may apply, for example, to commercial accounts where the convenience of quality online images may actually save time and money.

11. User account history. This factor may indicate whether the account has had fraudulent activities conducted thereon. Accounts with suspicious activity (i.e. sudden change in check amounts and usage patterns) and accounts that have been red-flagged may be kept more carefully to allow later audits and more on-demand information. For example, where a user request a high-quality archive version, and that high-quality image replaces the current active version, that high-quality image may be kept longer in active version 7 because it was specifically requested.

12. Object part imaged. For example, the front of a check contains key information and is generally of higher contrast than the back of the checks. Thus, the fronts of checks may be further reduced more safely than the backs of checks. Also private individuals with poor record keeping skills are more likely to want to see the fronts of their checks than the bank endorsements on the back of their checks. For such individual accounts, the banks may discard the back of the checks in the active version 7 much earlier than the fronts.

The above-described financial institution reduction criteria are not exhaustive.

It should be recognized that other industries may have different reduction criteria. For example, a photograph developer may have different priorities and, hence, different criteria.

C. Exemplary Operation

In our exemplary banking industry environment, as noted above, a typical bank would capture and archive compressed, but substantially lossless quality versions of documents such as checks on a daily basis. Once archived, active version 7 is updated to include these same images. Periodically (e.g., monthly or quarterly) active version 7 is evaluated. To make room for the new images, individual images are either: left alone, reduced or purged.

Referring to FIGS. 4-11, exemplary images created by a bank according to the invention are shown. For purposes of description, images having differing quality and/or legibility and, hence, differing data storage size, may be described as being part of a "level." Continuing with our example, a bank may include a base level and at least one secondary level of images as outlined in the following table:

| Image Level | Image Quality | Image Legibility | Image Storage Size |
|---|---|---|---|
| Base Level | High | High | Large |
| Secondary Level 1 | Medium | High | Middle |
| Secondary Level 2 | Low-medium | Medium-high | Small |
| Secondary Level 3 | Low | Medium | Very small |

Figure 4:
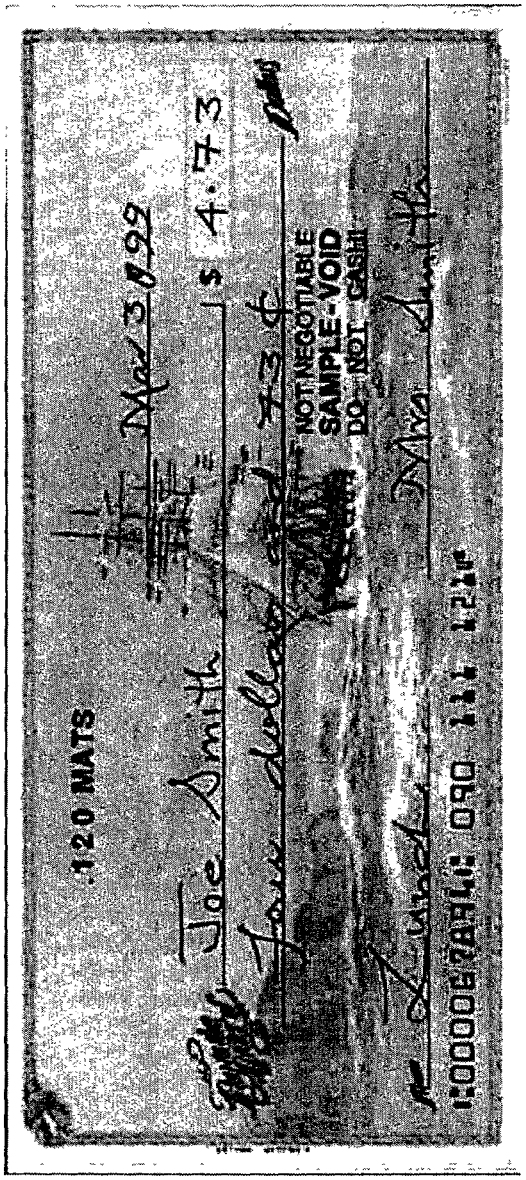
FIGS. 4-11 show a progressively reduced-in-size image created according to the invention.

The base level of images refers to those images stored in archive version 6, and initially stored in active version 7. FIG. 4 shows an example of this type image. The first level images are preferably in compressed format, e.g., a JPEG format. Each secondary level of images is a size-reduced version of the images based on the reduction criteria and stored in active version 7. As indicated, there may be a number of secondary levels that each represent an iteration of reduction on a particular image. However, movement from one level to another more size-reduced level does not necessarily have to be sequentially through the indicated levels, e.g., reduction may reduce an image from the base level to secondary level 3, skipping secondary levels 1 and 2.

Figure 5:
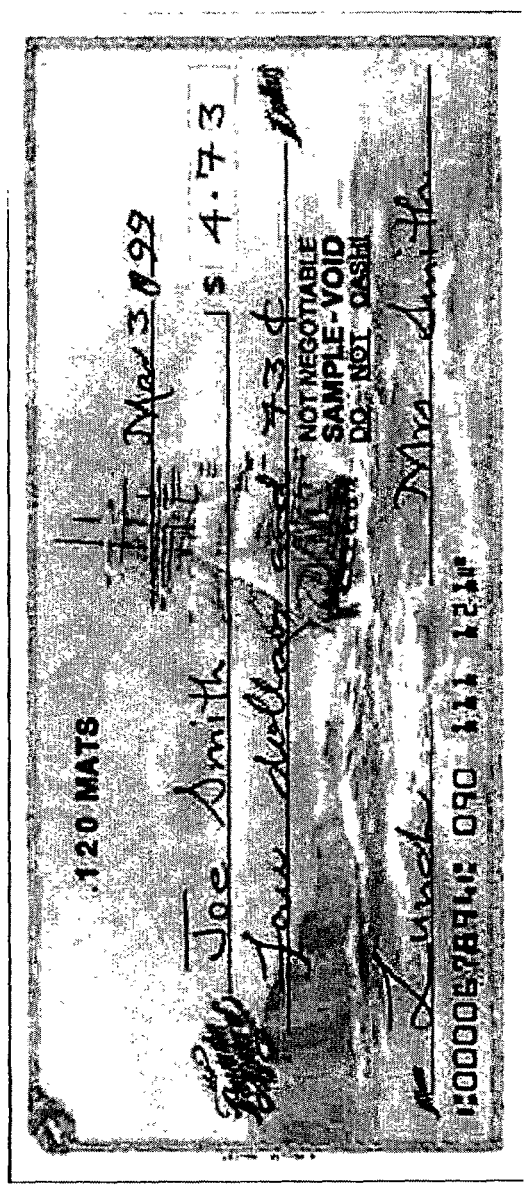
Figure 6:
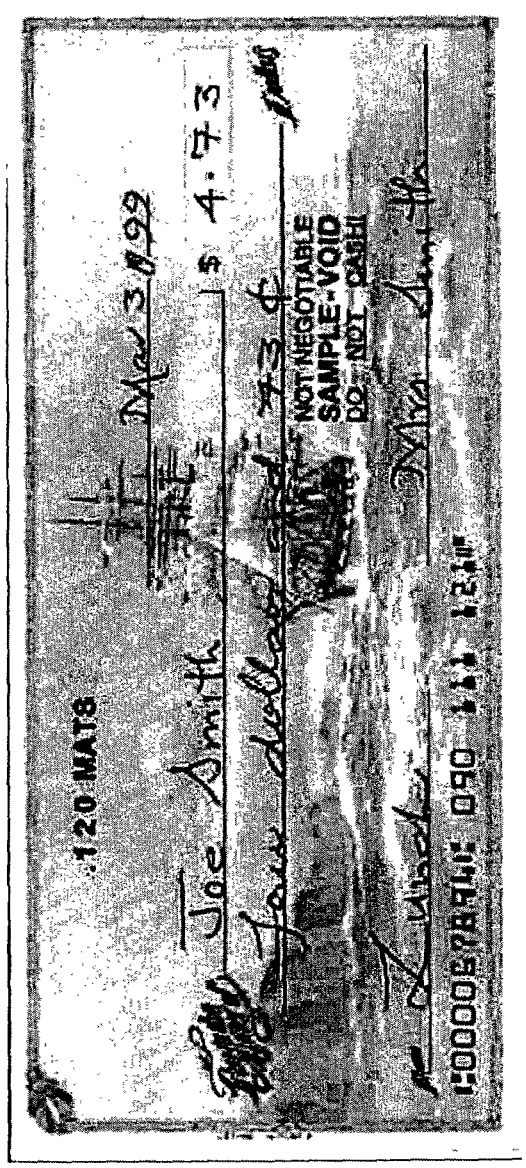
Figure 8:
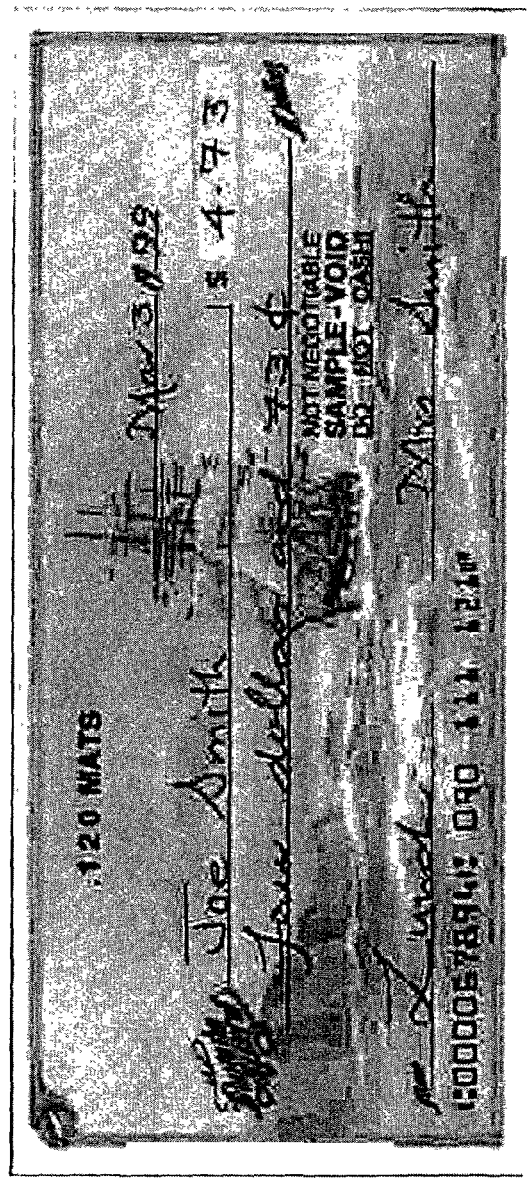
Figure 9:
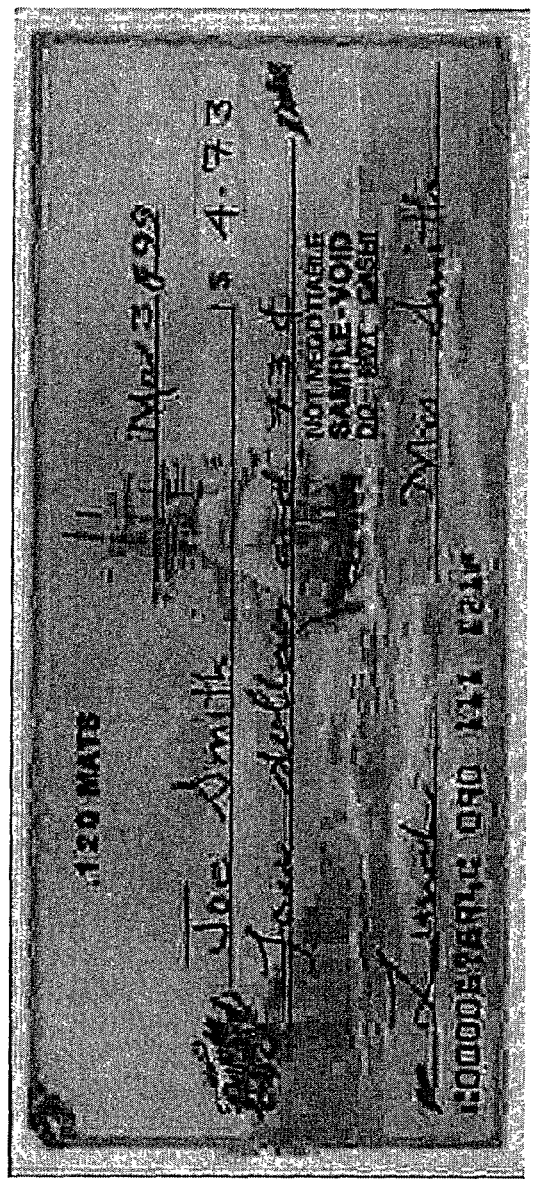
Figure 10:
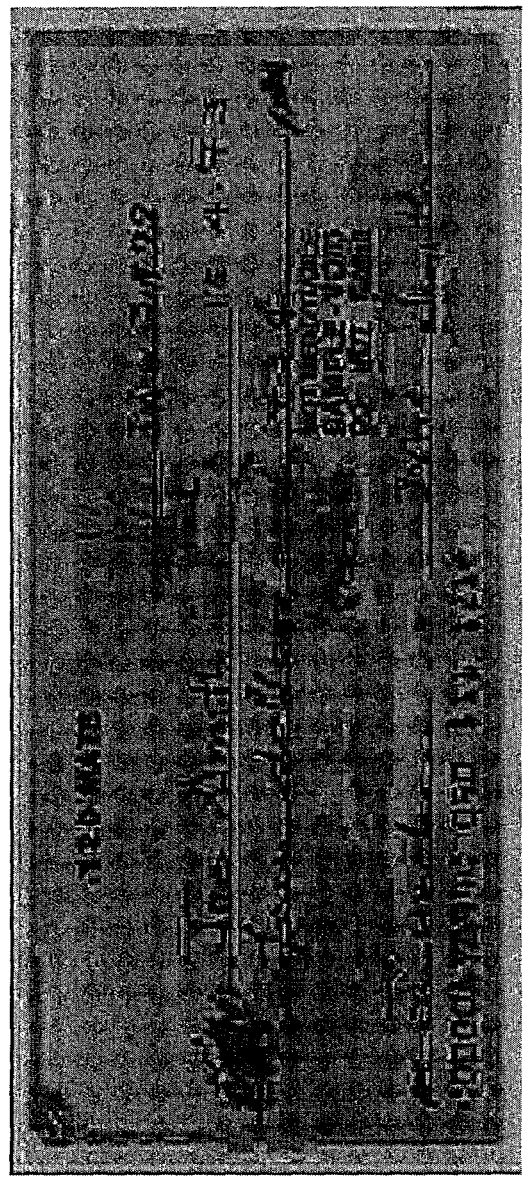
Figure 11:
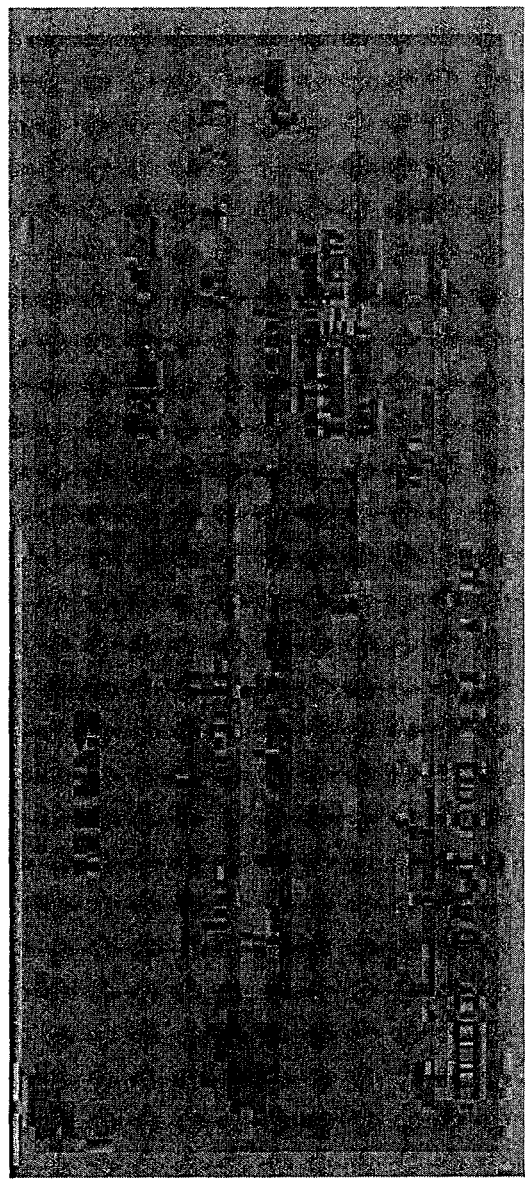

In the instant case, three secondary levels are present. Each secondary level preferably includes different quantization tables than every other secondary level and the base level. Hence, a first secondary level (1) exhibits lower image quality compared to the base level; a second secondary level (2) exhibits lower image quality compared to the first secondary level (1); and the third secondary level (3) exhibits lower image quality compared to the second secondary level (2). FIGS. 5 and 6 represent exemplary secondary level 1 images; FIGS. 7 and 8 represent exemplary secondary level 2 images; and FIGS. 9 and 10 represent exemplary secondary level 3 images. FIG. 11 represents an image where further reduction is probably inadvisable, and the image would be purged.

Actual stored image sizes, in bytes, for FIGS. 4-11 using Huffman coding and arithmetic coding are as follows:

| FIG.: | Huffman Coding | Arithmetic Coding |
|---|---|---|
| 11 | 3,717 | 1,216 |
| 10 | 4,823 | 2,649 |
| 9 | 6,775 | 4,880 |
| 8 | 8,666 | 6,621 |
| 7 | 10,260 | 8,190 |
| 6 | 11,766 | 9,604 |
| 5 | 13,143 | 10,989 |
| 4 | 14,553 | 12,306 |

In accordance with our hypothetical example, a bank may include in its (simplified) reduction criteria that accounts having over $10,000 in them will be treated as elite users and, hence, provided high quality images for longer periods of time. Similarly, users with less than $10,000 will be provided only the highest quality images for a shorter period. The bank may then provide base level images to elite users for one (1) month duration from the time of capture. The bank may then implement reduction/purging rules to drop the image(s) to secondary level 1 for the next eleven (11) months duration and finally to secondary level 3 for the next six (6) years duration. For the non-elite user, the bank may implement reduction/purging rules to provide secondary level 1 for the first month, secondary level 2 for the next month and secondary level 3 for the next six (6) years. Note that at all times, any user can request a high quality, substantially lossless quality image from archive version 6.

Using the above system and method, each entity can efficiently reduce data storage space for images based on their own reduction criteria. In addition, each entity can implement reduction criteria and reduction/purging rules tailored to their industry and customers. As a result, each entity can provide images online for longer periods of time, increase transmission speed of images and provide better customer service.

IV. Alternatives and Other System Components:

The invention has been described in terms of a periodic evaluation function. It is also possible to further reduce requested images on-the-fly to decrease download time. For example, a banking customer could request the lowest quality image to visually confirm the amount fields for their trusted/known/long-time payees and the highest quality for new payees at download time. The reduced quality images could be stored simultaneously and in a few days the original quality (if not requested) could be discarded.

The invention has been described relative the image inventory that is stored in an archive version 6 and an active version 7, with evaluation occurring on the active version. The evaluation and reduction techniques of the invention, however, can be applied to any image or image inventory (or part thereof) regardless of whether it is made available online. Hence, the teachings of the invention should not be limited to application to online image inventories.

The invention has been described in terms of the banking industry with documents such as checks, credit card receipts, stocks and bonds, etc. The same system and method can work for other image inventories where the need for high quality images may lessen over time. One such application could be an online photograph library of current events. If an indication of where the highest quality/archived copy can be obtained is still available with the low quality images, the low quality images can help to decide which larger, higher quality images need to be downloaded. Hence, the library can offer reduced quality images for research/browsing purposes, which reduces data storage needs, and have the high quality version stored for access when desired. Once the user completes their research, a high quality image can always be requested from the library archives.

Another application is helping individuals manage image data size on a personal computer. For example, where individuals upload their digital images to their web sites, in order to keep the total storage size down, the user could (or have a system 26) further reduce the older images based on reduction criteria.

Images stored to different levels of quality may also be stored with different entropy coding or compression algorithms. The JPEG baseline requires the use of Huffman coding. In this invention, custom Huffman tables are allowed. However, further compression without any change in quality is possible with the arithmetic entropy coding option. Generally, the smaller the compressed stored image size the larger the improvement because the Huffman codes are limited to integer bits per code word and require at least one bit for each symbol. The arithmetic coding does not have this limitation and can code effectively to the entropy limit. Unfortunately, most web browsers do not support this option today so additional recoding may be needed. In addition, the original images may have been lossy JPEG baseline compressed. After several iterations, lossy compression may no longer be acceptable. A lossless or near lossless algorithm such as JPEG LS may be chosen instead.

The components of the invention including, for example, image management system 8 and data management system 26, may be used alone or with other system components 28. Other system components 28 may include any well known document processing system components, e.g., an image capture processor, alteration indicating system, etc. One exemplary system component 28 is a statistical tracking system to keep statistical data about the retrieval usage of images over time to help make decisions regarding the reduction criteria and when to further reduce or purge image data.

An image authentication system can also be added for security. For example, visible and invisible watermarks can be implemented. Other methods can be used to authenticate that a reduced image, although not the highest quality nor the archived version, came from the originating entity and is an authorized version. Optionally, the images can contain a uniform resource locator (URL) link back to a higher quality version (e.g., in archive version 6) with appropriately secure access. Traceability of the recursively reduced image can also be an optional part of the authentication system.

In the previous discussion, it will be understood that the method steps discussed preferably are performed by a processor, such as CPU 14 of system 8, executing instructions of program product 22 stored in memory. It is understood that the various devices, modules, mechanisms and systems described herein may be realized in hardware, software, or a combination of hardware and software, and may be compartmentalized other than as shown. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. The present invention can also be embedded in a computer program product, which comprises all the features enabling the implementation of the methods and functions described herein, and which—when loaded in a computer system—is able to carry out these methods and functions. Computer program, software program, program, program product, or software, in the present context mean any expression, in any language, code or notation, of a set of instructions intended to cause a system having an information processing capability to perform a particular function either directly or after the following: (a) conversion to another language, code or notation; and/or (b) reproduction in a different material form.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:

1. A method for managing an image of a financial document stored in a database, the method comprising the steps of:

reducing a storage size of the image from a base level to at least one secondary level based on reduction criteria that determine to what extent the storage size of the image can be reduced, wherein each secondary level is smaller in storage size than the base level;

wherein the step of reducing includes replacing the image with a size-reduced image version such that the size-reduced image version is the only version of the image stored in the database; and wherein the reduction criteria include considering available data storage, a time period that has elapsed since creation of the financial document, prior size reduction performed on the image associated with the financial document, access history detailing access to the financial document, value of the financial document, a type of account that is associated with the financial document, a volume of other financial documents that are associated with the account, a total value associated with the account, a preselected reduction profile of a user listed on the account that designates desired image reduction options that can be performed on documents in the account, whether any user fees have been paid to improve image quality of financial documents that are associated with the account, whether an account history indicates the account as having had suspicious activity conducted thereon, and whether the financial document contains information on a front-side and a back-side of the document.

2. The method of claim 1, further comprising the step of repeating the step of reducing to reduce the storage size of the size-reduced image from one secondary level to another secondary level based on the reduction criteria.

3. The method of claim 2, wherein the step of repeating occurs after expiration of a predetermined duration.

4. The method of claim 1, wherein the base level is a compressed format and each secondary level has a different Q-table than the base level.

5. The method of claim 4, wherein the compressed format is a JPEG baseline compression format.

6. The method of claim 4, wherein the compressed format is a JPEG 2000 compression format.

7. The method of claim 4, wherein the at least one secondary level includes at least two secondary levels, each secondary level having a different Q-table than every other secondary level.

8. The method of claim 7, wherein a first secondary level exhibits lower image quality compared to the base level; and a second secondary level exhibits lower image quality compared to the first secondary level.

9. The method of claim 8, wherein the at least two secondary levels includes at least three secondary levels; and a third secondary level exhibits lower image quality compared to the second secondary level.

10. The method of claim 1, wherein the image includes a plurality of images.

11. The method of claim 1, wherein the step of reducing includes compressing the image.

12. The method of claim 1, wherein the image is in a compressed format and the step of reducing includes entropy decoding the image, changing quantized coefficients and quantization tables, and entropy recoding the image.

13. The method of claim 1, wherein an initial step of reducing includes deleting a portion of the image.

14. The method of claim 1, further comprising the step of maintaining a copy of image at the base level.

15. The method of claim 14, further comprising the step of replacing the image at the secondary level with a copy of the image at the base level when a user requests access to the copy of the image at the base level.

16. The method of claim 15, wherein the user includes an indication of the duration that the base level will be required when the user requests the copy of the image at the base level.

17. The method of claim 1, wherein a final step of reducing includes purging the image.

18. The method of claim 1, further comprising the step of maintaining statistical data for comparison with the reduction criteria.

19. A method of managing storage size of an image of a financial document, wherein the image is accessed by a user, the method comprising the steps of:
reducing the storage size of the image based on reduction criteria to create a size-reduced version, the size-reduced version replacing the image such that the size-reduced image version is the only version of the image stored in the database, wherein the reduction criteria determine to what extent the storage size of the image can be reduced, the reduction criteria include considering available data storage, a time period that has elapsed since creation of the financial document, prior size reduction performed on the image associated with the financial document, access history detailing access to the financial document, value of the financial document, a type of account that is associated with the financial document, a volume of other financial documents that are associated with the account, a total value associated with the account, a preselected reduction profile of a user listed on the account that designates desired image reduction options that can be performed on documents in the account, whether any user fees have been paid to improve image quality of financial documents that are associated with the account, whether an account history indicates the account as having had suspicious activity conducted thereon, and whether the financial document contains information on a front-side and a back-side of the document;
allowing user access to the size-reduced version for a predetermined duration; and
repeating the steps of reducing and allowing after expiration of the predetermined duration, wherein each reduction replaces a previous size-reduced version.

20. The method of claim 19, wherein the step of reducing includes compressing the image.

21. The method of claim 19, wherein the image is in a compressed format and the step of reducing includes achieving more compression.

22. The method of claim 21, wherein the step of reducing includes entropy decoding the image, changing quantized coefficients and quantization tables, and entropy recoding the image.

23. The method of claim 19, wherein an initial step of reducing includes deleting a portion of the image.

24. The method of claim 19, further comprising the step of maintaining a substantially lossless quality version of the image.

25. The method of claim 24, further comprising the step of allowing the user to access the substantially lossless quality version upon request.

26. The method of claim 19, wherein a final step of reducing includes purging the image.

27. A system for managing storage size of an image of a financial document where the image is accessed by a user online, the system comprising:
a size-reduction evaluator to periodically evaluate whether the image is subject to a size reduction based on size-reduction criteria, wherein the size-reduction criteria determine to what extent the storage size of the image can be reduced, the reduction criteria include considering available data storage, a time period that has elapsed since creation of the financial document, prior size reduction performed on the image associated with the financial document, access history detailing access to the financial document, value of the financial document, a type of account that is associated with the financial document, a volume of other financial documents that are associated with the account, a total value associated with the account, a preselected reduction profile of a user listed on the account that designates desired image reduction options that can be performed on documents in the account, whether any user fees have been paid to improve image quality of financial documents that are associated with the account, whether an account history indicates the account as having had suspicious activity conducted thereon, and whether the financial document contains information on a front-side and a back-side of the document; and a size reducer to reduce the size of the image based on instructions from the size-reduction evaluator and to replace the image with a size-reduced image version such that the size-reduced image version is the only version of the image stored in the database.

28. The system of claim 27, further comprising a designator to assign the image a designation indicative of the status of the image based on the size-reduction criteria.

29. The system of claim 27, further comprising a storage module to save a substantially lossless quality version of the image.

30. The system of claim 27, wherein the size-reduction evaluator determines whether to leave the image alone, reduce the storage size of the image or purge the image.

31. The system of claim 27, wherein a first activation of the size reducer purges an image portion of the image.

32. The system of claim 27, wherein the image is in a compressed format and the size reducer is adapted to decode the image, change a dynamic range scaling of the image, and recode the image.

33. The system of claim 27, wherein the size-reduction evaluator determines a reduction/purging rule to be followed by the size reducer based on the reduction criteria.

34. A system for managing storage size of an image of a financial document, wherein the image is accessed by a user, the system comprising:

means for evaluating the image based on reduction criteria to determine whether to reduce the data storage size of the image, leave the image alone or purge the image, wherein the reduction criteria determine to what extent the storage size of the image can be reduced, the reduction criteria include considering available data storage, a time period that has elapsed since creation of the financial document, prior size reduction performed on the image associated with the financial document, access history detailing access to the financial document, value of the financial document, a type of account that is associated with the financial document, a volume of other financial documents that are associated with the account, a total value associated with the account, a preselected reduction profile of a user listed on the account that designates desired image reduction options that can be performed on documents in the account, whether any user fees have been paid to improve image quality of financial documents that are associated with the account, whether an account history indicates the account as having had suspicious activity conducted thereon, and whether the financial document contains information on a front-side and a back-side of the document; and means for reducing the data storage size of the image based on the results of the means for evaluating and for replacing the image with a size-reduced image such that the size-reduced image version is the only version of the image stored in the database.

35. A program product stored on a non-transitory computer readable medium for managing a size of a stored image of a financial document that is accessible to a user, the computer readable medium comprising program code for performing the following steps:

evaluating the image based on reduction criteria which are independent of image capture to determine whether to reduce the data storage size of the image, leave the image alone or purge the image, wherein the reduction criteria determine to what extent the storage size of the image can be reduced, the reduction criteria include considering available data storage, a time period that has elapsed since creation of the financial document, prior size reduction performed on the image associated with the financial document, access history detailing access to the financial document, value of the financial document, a type of account that is associated with the financial document, a volume of other financial documents that are associated with the account, a total value associated with the account, a preselected reduction profile of a user listed on the account that designates desired image reduction options that can be performed on documents in the account, whether any user fees have been paid to improve image quality of financial documents that are associated with the account, whether an account history indicates the account as having had suspicious activity conducted thereon, and whether the financial document contains information on a front-side and a back-side of the document; and reducing the data storage size of the image based on the results of the evaluating and replacing the image with a size-reduced image version such that the size-reduced image version is the only version of the image stored in the database.

* * * * *